(12) United States Patent
Ajbani et al.

(10) Patent No.: US 7,150,919 B2
(45) Date of Patent: *Dec. 19, 2006

(54) OVERMOLDED GRIP

(75) Inventors: Manoj Ajbani, Copley, OH (US); Christopher Kiehl, Akron, OH (US); Thierry Florent Edme Materne, Lasne (BE)

(73) Assignee: The Goodyear Tire & Rubber Company, Akron, OH (US)

( * ) Notice: Subject to any disclaimer, the term of this patent is extended or adjusted under 35 U.S.C. 154(b) by 427 days.

This patent is subject to a terminal disclaimer.

(21) Appl. No.: 10/761,174

(22) Filed: Jan. 20, 2004

(65) Prior Publication Data

US 2004/0151933 A1 Aug. 5, 2004

Related U.S. Application Data

(63) Continuation-in-part of application No. 10/672,675, filed on Sep. 26, 2003.

(60) Provisional application No. 60/434,924, filed on Dec. 18, 2002, provisional application No. 60/414,722, filed on Sep. 30, 2002.

(51) Int. Cl.
*B32B 25/04* (2006.01)

(52) U.S. Cl. ...................... 428/492; 428/521; 428/522; 524/474

(58) Field of Classification Search ................ 428/521, 428/522, 432; 524/474
See application file for complete search history.

(56) References Cited

U.S. PATENT DOCUMENTS

| | | | |
|---|---|---|---|
| 3,686,364 A | 8/1972 | Robinson et al. ............ 260/876 |
| 3,758,643 A | 9/1973 | Fisher ........................ 260/897 |
| 3,806,558 A | 4/1974 | Fisher ........................ 260/897 |
| 3,865,776 A | 2/1975 | Gergen ...................... 260/33.6 |
| 4,104,210 A | 8/1978 | Coran et al. ................ 525/232 |
| 4,130,535 A | 12/1978 | Coran et al. ................ 524/487 |
| 4,202,801 A | 5/1980 | Petersen ...................... 525/232 |
| 4,250,273 A | 2/1981 | Bohm et al. ................... 525/99 |
| 4,271,049 A | 6/1981 | Coran et al. ................. 525/191 |
| 4,311,628 A | 1/1982 | Abdou-Sabet et al. ...... 524/447 |
| 4,340,684 A | 7/1982 | Bohm et al. ................. 525/194 |
| 4,343,918 A | 8/1982 | Bohm et al. ................. 525/194 |
| 4,927,882 A | 5/1990 | Bayan ........................ 525/99 |
| 5,051,478 A | 9/1991 | Puydak et al. .............. 525/195 |
| 5,239,009 A | 8/1993 | Halasa et al. ............... 525/258 |
| 5,248,729 A | 9/1993 | Inoue et al. ............... 525/92 B |
| 5,272,220 A | 12/1993 | Rodgers et al. .......... 525/332.3 |
| 5,334,677 A | 8/1994 | Razavi et al. ............... 526/114 |
| 5,448,003 A | 9/1995 | Hsu et al. .................... 526/181 |
| 5,476,914 A | 12/1995 | Ewen et al. ................. 526/351 |
| 5,597,857 A * | 1/1997 | Thibaut et al. ............. 524/400 |
| 5,677,402 A | 10/1997 | Halasa et al. ............... 526/174 |
| 5,679,751 A | 10/1997 | Halasa et al. ............... 526/174 |
| 5,844,044 A | 12/1998 | Sandstrom et al. ......... 525/237 |
| 6,140,434 A | 10/2000 | Halasa et al. ............... 526/174 |
| 6,289,959 B1 | 9/2001 | Hsu et al. .................... 152/450 |
| 6,293,325 B1 | 9/2001 | Hsu et al. .................... 152/450 |
| 6,313,216 B1 | 11/2001 | Christian et al. ........... 524/575 |
| 6,372,863 B1 | 4/2002 | Kerns et al. .................. 526/65 |
| 6,566,478 B1 | 5/2003 | Henning et al. ............ 526/335 |
| 6,797,779 B1 * | 9/2004 | Ajbani et al. ............... 525/191 |

* cited by examiner

*Primary Examiner*—Leszek B. Kiliman
(74) *Attorney, Agent, or Firm*—Alvin T. Rockhill

(57) ABSTRACT

The present invention discloses a thermoplastic elastomer composition which is comprised of (a) a thermoplastic resin selected from the group consisting of polyolefin resin, polyphenylene ether, and polystyrene, wherein the thermoplastic resin is present at a level of up to 60 parts by weight, (b) 5 to 90 parts by weight of a rubbery elastomer that is comprised of repeat units that are derived from a conjugated diene monomer selected from 1,3-butadiene and isoprene, wherein the repeat units in the rubbery polymer are distributed through the rubbery polymer in an essentially random manner, wherein the rubbery polymer is a solution polymer, and is optionally, at least partially crosslinked, (c) 5 to 90 parts by weight of a highly saturated elastomer selected from the group consisting of styrene-ethylene butylene-styrene, styrene-ethylene propylene-styrene, hydrogenated polybutadiene, hydrogenated polyisoprene, hydrogenated styrene-isoprene random copolymers, hydrogenated styrene-isoprene block copolymers, hydrogenated styrene-butadiene random copolymers, hydrogenated styrene-butadiene block copolymers, hydrogenated styrene-isoprene block copolymers, and hydrogenated styrene-isoprene/butadiene-styrene block copolymer, and (d) 15 to 600 parts by weight of an oil.

24 Claims, No Drawings

OVERMOLDED GRIP

This patent application is a continuation in part application of U.S. patent application Ser. No. 10/672,675, filed on Sep. 26, 2003, which claims the benefit of U.S. Provisional Patent Application Ser. No. 60/414,722, filed on Sep. 30, 2002, and U.S. Provisional Patent Application Ser. No. 60/434,924, filed on Dec. 18, 2002.

FIELD OF THE INVENTION

The present invention relates to the use of a soft themoplastic elastomer composition overmolded on a hard substrate, such as a metal or a thermoplastic resin, for grips or handles on various household items.

BACKGROUND OF THE INVENTION

Plastic handles of various shapes and sizes are found on many household items. Such household items include toothbrushes, shaving razors, hairbrushes, pens, tools, kitchen appliances and kitchen utensils. These household items have a variety of functions, but in most cases, it is desirable for the user to grip the handle of these items firmly, so that it does not fall out of the user's hand. In other cases, such as with a knife or fork or a tool, it is desirable for the item to be gripped with even more firmness so that it can be leveraged.

Because the handles of these household items are normally made of a hard plastic, the simplest tasks can become problematic. As in the case of a toothbrush or shaving razor, the handle generally comes into contact with water. When the toothbrush or razor is wet, it is difficult to grip and may slip out of the user's hands. Other items such as tools or kitchen utensils can have handles that are difficult to hold onto or uncomfortable to grip because of the hardness of the plastic material. For persons suffering from arthritis, carpal tunnel syndrome or other hand injuries or infirmities, using these basic household objects can become more difficult or even impossible.

Most people would prefer to grip objects with a softer handle that is more soothing to the touch and easier to grip. Accordingly, a need exists for a soft grip handle that can be grasped firmly and comfortably and which requires minimum strength and dexterity to grip and maneuver.

U.S. Pat. No. 4,250,273 suggests a thermoplastic elastomer composition comprising from about 10 to about 50 parts of a crystalline olefin polymer, from about 80 to about 15 parts by weight of a random styrene-butadiene rubber, and about 5 to about 55 parts by weight of a highly saturated elastomer.

U.S. Pat. No. 4,340,684 suggests a thermoplastic elastomer composition comprising from about 10 to about 50 parts of a crystalline olefin polymer, from about 80 to about 15 parts by weight of a random styrene-butadiene rubber, and about 5 to about 55 parts by weight of a highly saturated elastomer, where in the blend was partially cured so that a thermoplastic elastomer was formed which had a melt flow index of at least 1.0 when tested in accordance with ASTM D 1238 condition L at a load of 100 pounds. The authors suggest that when the melt flow rate of the formed blend was less than 1.0, thermosetting formulations were formed.

U.S. Pat. No. 4,343,918 claims the process for making a thermoplastic elastomer composition comprising from about 10 to about 50 parts of a crystalline olefin polymer, from about 80 to about 15 parts by weight of a random styrene-butadiene rubber, and about 5 to about 55 parts by weight of a highly saturated elastomer.

U.S. Pat. No. 4,927,882 claims a thermoplastic elastomer composition having a compression set less than about 30% and produced by dynamic vulcanization of SBR to form a dispersed phase of crosslinked SBR in a co-continuous matrix of SEBS and polypropylene. The compositions had specific use in the pharmaceutical applications.

U.S. Pat. No. 4,957,968 discloses a adhesive thermoplastic elastomer composition consisting essentially of: (a) about 15 to 40 weight percent of at least one polyolefin selected from the group consisting of polyethylene, polypropylene and mixtures thereof, modified by grafting with an unsaturated an aliphatic carboxylic acid or its derivatives selected from the group consisting of acid anhydride, acid chloride, isocyanate, oxazoline, epoxide, amine and hydroxide; (b) about 10 to 70 weight percent of at least one other non-elastomeric polyolefin resin prepared from at least one monomer selected from the group consisting of: butene, isobutylene, octene-1,4-methyl pentene-1, ethylene, propylene, hexene-1 or mixtures thereof, and (c) about 20 to 80 weight percent of at least one partially cured olefinic elastomer, selected from the group consisting of elastomeric ethylene-propylene copolymer, elastomeric ethylene-propylene copolymers, elastomeric ethylene-propylene terpolymers, polyisoprene, polyisobutylene, polybutadiene, and natural rubber; wherein said partial cure of the elastomer is attained by a curing agent comprising about 1 to 99 percent of the amount necessary for a substantially complete cure.

U.S. Pat. No. 6,503,984 discloses a thermoplastic elastomer having adhesion to metal, molded polar polymers and textile fibers, said thermoplastic elastomer comprising: a) a dynamically crosslinked rubber, b) from about 20 to about 400 parts of a first polyolefin having from about 10 to about 26.5 weight percent crystallinity and a flexural modulus (tangent) from about 5,000 psi (34.5 Mpa) to about 20,000 psi (138 Mpa), and c) from about 10 to about 200 parts by weight of a functionalized polyolefin having pendant polar functional groups, wherein said polar functional groups are present at a level of about 0.5 to about 3.5 mole percent of the total repeating units of said functionalized polyolefin and said functionalized polyolefin is derived from polymerizing at least one monoolefin to form a semicrystalline polymer or is derived from hydrogenating the polydiene blocks of a block copolymer, and wherein said parts by weight are based on 100 parts by weight of crosslinked rubber.

There is a growing demand for a wide variety of articles that are soft and soothing to touch. It is, of course, also important for these articles to have the strength, durability, and rigidity needed in the applications where the articles are used. This can be accomplished by overmolding a soft thermoplastic composition onto on a hard thermoplastic substrate. However, there is a need for a soft thermoplastic elastomer composition that can be overmolded onto a hard thermoplastic resin substrate wherein the soft thermoplastic composition has lower hardness, good oil resistance and low compression set. There is currently a need for a thermoplastic composition that has superior feel and comfort as characterized by a lower modulus to that which is obtained by using syndiotactic polypropylene copolymer.

SUMMARY OF THE INVENTION

This invention relates to a thermoplastic elastomer that can be overmolded onto hard substrate, such as a plastic or metal surface. The thermoplastic elastomer composition of this invention offers the lower cost and lower hardness. It is also essentially odor-free, scratch resistant and can be colored as desired.

The present invention provides a low cost, gentle to the touch material for an easy to grip handle made from a soft thermoplastic elastomer composition overmolded on a hard thermoplastic resin substrate wherein the soft thermoplastic composition has lower hardness and superior feel and comfort. This invention provides a thermoplastic blend composition that has superior feel and comfort that is obtained by using a syndiotactic polypropylene.

The thermoplastic elastomer composition of this invention can be beneficially used in making grips or handles for articles of manufacture including, but not limited to, toothbrushes, shaving razors, hairbrushes, hairdryers, paintbrushes, pens, tools (saws, hammers, screwdrivers, wrenches, pliers), kitchen appliances (handles for refrigerator doors, ovens, dishwashers, bread warmers, trash compactors), kitchen utensils (spoons, forks, knives, spatulas, shish kabob skewers, vegetable peelers, can openers, bottle openers, corkscrews, whisks, basting brushes), vacuum cleaner handles, brooms, mops, rakes, shovels, scissors, sporting equipment (fishing poles, tennis rackets, firearms, and golf clubs), and dinghy brushes.

The present invention more specifically discloses an article of manufacture that is comprised of a soft thermoplastic elastomer composition overmolded onto a hard substrate, such as a metal or thermoplastic resin, wherein the soft thermoplastic composition is comprised of (a) 5 to 60 parts by weight of a thermoplastic resin selected from the group consisting of polyolefin resins and polystyrene, (b) 5 to 70 parts of a rubbery elastomer that is comprised of repeat units that are derived from a conjugated diene monomer selected from 1,3-butadiene and isoprene, wherein the rubbery elastomer is optionally at least partially crosslinked, wherein the repeat units in the rubbery polymer are distributed throughout the rubbery polymer in an essentially random manner, and wherein the rubbery polymer is a solution polymer, (c) 5 to 90 parts of a highly saturated elastomer selected from the group consisting of styrene-ethylene butylene-styrene polymers (SEBS), styrene-ethylene propylene-styrene polymers (SEPS), hydrogenated polybutadiene, hydrogenated polyisoprene, hydrogenated styrene-isoprene random copolymers, hydrogenated styrene-butadiene random copolymers, and (d) 15 to 200 parts by weight of an oil.

The subject invention further reveals a process for manufacturing an article of manufacture that comprises (1) melt blending (a) 5 to 60 parts by weight of a thermoplastic resin selected from the group consisting of polyolefin resins and polystyrene resins, (b) 5 to 70 parts of a rubbery elastomer that is comprised of repeat units that are derived from a conjugated diene monomer selected from 1,3-butadiene and isoprene, wherein the rubbery elastomer is optionally, at least partially crosslinked, wherein the repeat units in the rubbery polymer are distributed throughout the rubbery polymer in an essentially random manner, and wherein the rubbery polymer a solution polymer, (c) 5 to 90 parts of a highly saturated elastomer selected from the group consisting of styrene-ethylene butylene-styrene polymers (SEBS), styrene-ethylene propylene-styrene polymers (SEPS), hydrogenated polybutadiene, hydrogenated polyisoprene, hydrogenated styrene-isoprene random copolymers, hydrogenated styrene-butadiene random copolymers, (d) 15 to 200 parts by weight of an oil, and (e) a crosslinking agent to produce a soft thermoplastic composition, wherein the melt blending is conducted above the melt point of the thermoplastic resin, and wherein the crosslinking of the rubbery elastomer is conducted in a continuous mixer; (2) pelletizing the soft thermoplastic elastomer composition as it is being discharged from the continuous mixer, (3) overmolding the soft thermoplastic elastomer composition onto a hard substrate to produce the article of manufacture. In cases where the hard substrate is polystyrene or a polymer or copolymer that is synthesized from styrene monomer, it is preferred for the thermoplastic resin to be polystyrene to attain a better level of adhesion.

The present invention also discloses a polymeric composition which is comprised of (a) a syndiotactic polypropylene copolymer, (b) 5 to 70 parts of a rubbery elastomer that is comprised of repeat units that are derived from a conjugated diene monomer selected from 1,3-butadiene and isoprene, wherein the rubbery elastomer is at least partially crosslinked, wherein the repeat units in the rubbery polymer are distributed throughout the rubbery polymer in an essentially random manner, and wherein the rubbery polymer a solution polymer, (c) 5 to 90 parts of a highly saturated elastomer selected from the group consisting of styrene-ethylene butylene-styrene polymers (SEBS), styrene-ethylene propylene-styrene polymers (SEPS), hydrogenated polybutadiene, hydrogenated polyisoprene, hydrogenated styrene-isoprene random copolymers, hydrogenated styrene-butadiene random copolymers, (d) 15 to 200 parts by weight of an oil, and (e) a crosslinking agent.

The subject invention further reveals an article of manufacture that is comprised of a soft thermoplastic elastomer composition overmolded onto a hard substrate wherein the soft thermoplastic composition is comprised of (a) a thermoplastic resin selected from the group consisting of polyolefin resins, polyphenylene ether, and polystyrene, wherein the thermoplastic resin is present at a level of up to 60 parts by weight (b) 5 to 90 parts by weight of a rubbery elastomer that is comprised of repeat units that are derived from a conjugated diene monomer selected from 1,3-butadiene and isoprene, wherein the rubbery elastomer is optionally at least partially crosslinked, wherein the repeat units in the rubbery polymer are distributed throughout the rubbery polymer in an essentially random manner, and wherein the rubbery polymer is a solution polymer, (c) 5 to 90 parts by weight of a highly saturated elastomer selected from the group consisting of styrene-ethylene butylene-styrene polymers, styrene-ethylene propylene-styrene polymers, hydrogenated polybutadiene, hydrogenated polyisoprene, hydrogenated styrene-isoprene random copolymers, hydrogenated styrene-isoprene block copolymers, hydrogenated styrene-butadiene random copolymers, hydrogenated styrene-butadiene block copolymers, and (d) 15 to 600 parts by weight of an oil.

The subject invention also discloses a process for manufacturing an article of manufacture that comprises (1) melt blending (a) a thermoplastic resin selected from the group consisting of polyolefin resins, polyphenylene ether, and polystyrene, wherein the thermoplastic resin is present at a level of up to 60 parts by weight, (b) 5 to 90 parts of a rubbery elastomer that is comprised of repeat resin units that are derived from a conjugated diene monomer selected from 1,3-butadiene and isoprene, wherein the rubbery elastomer is optionally at least partially crosslinked, wherein the repeat units in the rubbery polymer are distributed throughout the rubbery polymer in an essentially random manner, and wherein the rubbery polymer is a solution polymer, (c) 5 to 90 parts of a highly saturated elastomer selected from the group consisting of styrene-ethylene butylene-styrene polymers, styrene-ethylene propylene-styrene polymers, hydrogenated polybutadiene, hydrogenated polyisoprene, hydrogenated styrene-isoprene random copolymers, hydrogenated styrene-isoprene block copolymers, hydrogenated styrene-butadiene random copolymers, hydrogenated styrene-butadiene block copolymers, and (d) a crosslinking agent to produce a soft thermoplastic composition, wherein the melt blending is conducted above the melt point of the thermoplastic resin, and wherein the crosslinking of the rubbery elastomer is conducted in a continuous mixer; (2) pelletizing the soft thermoplastic elastomer composition as it is being discharged from the mixer, (3) overmolding the soft thermoplastic elastomer composition onto a hard substrate to produce the article of manufacture.

The subject invention also reveals a thermoplastic elastomer composition which is comprised of (a) a thermoplastic resin selected from the group consisting of polyolefin resin, polyphenylene ether, and polystyrene, wherein the thermoplastic resin is present at a level of up to 60 parts by weight,(b) 5 to 90 parts by weight of a rubbery elastomer that is comprised of repeat units that are derived from a conjugated diene monomer selected from 1,3-butadiene and isoprene, wherein the repeat units in the rubbery polymer are distributed through the rubbery polymer in an essentially random manner, wherein the rubbery polymer is a solution polymer, and is optionally, at least partially crosslinked, (c) 5 to 90 parts by weight of a highly saturated elastomer selected from the group consisting of styrene-ethylene butylene-styrene, styrene-ethylene propylene-styrene, hydrogenated polybutadiene, hydrogenated polyisoprene, hydrogenated styrene-isoprene random copolymers, hydrogenated styrene-isoprene block copolymers, hydrogenated styrene-butadiene random copolymers, hydrogenated styrene-butadiene block copolymers, hydrogenated styrene-isoprene block copolymers, and hydrogenated styrene-isoprene/butadiene-styrene block copolymer, and (d) 15 to 600 parts by weight of an oil.

The present invention further discloses a thermoplastic elastomer overmoldable and adhesive composition comprising (a) a thermoplastic and functionalized polymer selected from the group consisting of a copolymers obtained by the hydrogenation of diene repeat units, olefinic resins, and styrene containing thermoplastic resins, wherein the said functional groups are selected from the group consisting of acid anhydrides, acid chlorides, carboxylic acids, isocyanates, epoxides, amines, hydroxyls, and glycidyl acrylates, and glycidylor methacrylates, wherein the thermoplastic and functionalized polymer is present at a level of up to about 500 parts, (b) 100 parts of dynamically crosslinked rubbery elastomer that is comprised of repeat units derived from the conjugated diene monomers selected from 1,3-butadiene, isoprene, and vinyl aromatic monomers, wherein the elastomer is crosslinked in the presence of the thermoplastic polymer, and wherein the thermoplastic elastomer overmoldable and adhesive composition is void of an unfunctionalized polyolefin resins, and wherein the thermoplastic elastomer composition is void of a non-elastomeric polyolefin resins.

The subject invention also discloses an article of manufacture that is comprised of a thermoplastic elastomer composition overmolded onto a hard substrate wherein the thermoplastic elastomer composition is comprised of (a) a thermoplastic and functionalized polymer selected from the group consisting of a copolymers obtained by the hydrogenation of diene repeat units, olefinic resins, and styrene containing thermoplastic resins, wherein the said functional groups are selected from the group consisting of acid anhydrides, acid chlorides, carboxylic acids, isocyanates, epoxides, amines, hydroxyls, and glycidyl acrylates, and glycidylor methacrylates, wherein the thermoplastic and functionalized polymer is present at a level of up to about 500 parts, (b) 100 parts of dynamically crosslinked rubbery elastomer that is comprised of repeat units derived from the conjugated diene monomers selected from 1,3-butadiene, isoprene, and vinyl aromatic monomers, wherein the elastomer is crosslinked in the presence of the thermoplastic polymer, and wherein the thermoplastic elastomer overmoldable and adhesive composition is void of an unfunctionalized polyolefin resins, and wherein the thermoplastic elastomer composition is void of a non-elastomeric polyolefin resins.

The present invention further reveals a process for manufacturing an article of manufacture that comprises (1) preparing thermoplastic elastomer composition overmolded onto a hard substrate wherein the thermoplastic elastomer overmoldable and adhesive composition is comprised of (a) a thermoplastic and functionalized polymer selected from the group consisting of a copolymers obtained by the hydrogenation of diene repeat units, olefinic resins, and styrene containing thermoplastic resins, wherein the said functional groups are selected from the group consisting of acid anhydrides, acid chlorides, carboxylic acids, isocyanates, epoxides, amines, hydroxyls, and glycidyl acrylates, and glycidylor methacrylates, wherein the thermoplastic and functionalized polymer is present at a level of up to about 500 parts, (b) 100 parts of dynamically crosslinked rubbery elastomer that is comprised of repeat units derived from the conjugated diene monomers selected from 1,3-butadiene, isoprene, and vinyl aromatic monomers, wherein the elastomer is crosslinked in the presence of the thermoplastic polymer, and wherein the thermoplastic elastomer overmoldable and adhesive composition is void of an unfunctionalized polyolefin resins, and wherein the thermoplastic elastomer composition is void of a non-elastomeric polyolefin resins, (2) pelletizing the soft thermoplastic elastomer composition as it is being discharged from the mixer, (3) overmolding the soft thermoplastic elastomer composition onto a hard substrate to produce the article of manufacture.

DETAILED DESCRIPTION OF THE INVENTION

The thermoplastic resin is normally a polyolefin resin or polystyrene. The polyolefin resin can be polyethylene, isotactic polypropylene, syndiotactic polypropylene, polypropylene impact copolymers containing about 1–7 percent by weight of ethylene, butene, hexene, or octene, polyolefin copolymers such as ethylene-butene, hexene, or octene, polybutene, reactor grade modified polypropylene, oxypolyolefin, or metallocene polypropylene. Syndiotactic polypropylene resins are highly preferred. Isotactic polypropylene copolymers with ethylene, butene or hexene that are prepared with traditional Ziegler-Natta catalyst (non-metallocene catalyst) are also highly preferred.

Syndiotactic polypropylenes that are described in U.S. Pat. No. 5,476,914 and U.S. Pat. No. 5,334,677 may be used in preparing the thermoplastic elastomer compositions. The teachings of U.S. Pat. No. 5,476,914 and U.S. Pat. No. 5,334,677 are incorporated herein by reference. The syndiotactic polypropylenes used may be homopolymers or copolymers. The syndiotactic polypropylenes utilized in the present invention comprise at least 15 percent syndiotactic molecules, more preferably at least 50 percent syndiotactic molecules, and most preferably at least 82% syndiotactic molecules. Syndiotactic homopolymers or copolymers with ethylene may be used. For instance, commercial syndiotactic polypropylenes, such as those sold by Atofina may be used. The syndiotactic polypropylene used will preferably have a melt flow rate greater than 0.5 g/10 minutes at 230° C./2.16 kg load as determined by ASTM D 1238, more preferably between 10 and 110 g/10 minutes.

A reactor grade impact modified polypropylene can also be used. A publication article in Modem Plastics Encyclopedia/89, mid October 1988 Issue, Volume 65, Number 11, pages 86–92, describes several types of polypropylenes, which is incorporated herein as a reference for the types of polypropylenes that may be used in the blends of the said invention. Metallocene based polypropylene resins that may be produced by single-site technology can also generally be used. The polypropylene produced by methods described in "Metocene TM, Precise Tailoring of Polypropylene Resins Using Single-Site Technology," David Fischer, Presented at the SPE Automotive TPO Global Conference 2001, Hyatt Regency, Dearborn, Mich., Oct. 1–3, 2001, can also normally be used. The teachings of this reference are incorporated herein by reference.

Reactor grade thermoplastic olefins (TPOs) as produced by Basell Polyolefins and as described in TPE 2003 Conference Proceedings, RAPRA Technology Limited, Brussels, Belgium, Sep. 16–17, 2003, page 73 may also be used as a resin when a lower modulus and low hardness soft grip is desired. A linear low-density polyethylene resin may also be used for lower modulus soft-grips.

The thermoplastic resins that are useful in the present invention can also include polyphenylene ether (PPE) resins (also known within the art as "Polyphenylene Oxide"), styrene containing resins such as styrene-acrylonitrile resins (SAN), acrylonitrile-butadiene resins (ABS), and the functionalized versions of PPE and styrene containing resins that contain one functional group selected from the group consisting of maleic anhydride, hydroxyls, amines, epoxides, and glycidyl methacrylates.

The functional groups are particularly useful for compatibilizing the thermoplastic resins with the saturated block copolymers and the diene containing elastomers by virtue of reactive grafting of the functional groups present on the said thermoplastic resins with the functional groups present on the saturated block copolymers and the diene containing elastomers.

Polyphenylene ether resins that are most useful in this invention include but are not limited to poly(2,6-dimethyl-1,4-phenylene ether), poly(2,6-dimethyl-co-2,3,6-trimethyl-1,4-phenylene ether), poly(2,3,6-trimethyl-1,4-phenylene ether), poly(2,6-diethyl-1,4-phenylene ether), poly(2-methyl-6-propyl-1,4-phenylene ether), poly(2,6-dipropyl-1,4-phenylene ether), poly(2-ethyl-6-propyl-1,4-phenylene ether), poly(2,6-dilauryl-1,4-phenylene ether), poly(2,6-dephenyl-1,4-phenylene ether), poly(2,6-dimethoxy-1,4phenylene ether), poly(1,6-diethoxy-1,4-phenylene ether), poly(2-methoxy-6-ethoxy-1,4-phenylene ether), poly(2-ethyl-6-stearyloxy-1,4-phenylene ether), poly(2,6-dichloro-1,4-phenylene ether), poly(2-methyl-6-phenyl-1,4-phenylene ether), poly(2-ethoxy-1,4-phenylene ether), poly(2-chloro-1,4-phenylene ether), poly(2,6-dibromo-1,4-phenylene ether), and poly(3-bromo-2,6-dimethyl-1,4-phenylene ether), their respective homopolymers or copolymers.

The olefinic resin used may be used at a level of about 5 to about 60 parts, preferably at a level of about 10 to about 40 parts, and most preferably at a level of about 15 to about 30 parts based upon 100 parts of total thermoplastic elastomer blend composition.

The elastomer polymerized by solution polymerization techniques can be a diene elastomer that is made with polymerization in a solvent such as hexane or cyclohexane. Such elastomers are well known to those skilled in this art. U.S. Pat. No. 6,566,478, U.S. Pat. No. 6,313,216, U.S. Pat. No. 6,372,863, U.S. Pat. No. 6,293,325, U.S. Pat. No. 6,289,959, U.S. Pat. No. 6,140,434, U.S. Pat. No. 5,844,044, U.S. Pat. No. 5,679,751, U.S. Pat. No. 5,677,402, U.S. Pat. No. 5,448,003, U.S. Pat. No. 5,239,009 and U.S. Pat. No. 5,272,220 generally describe such elastomers and methods for their synthesis. The teachings of these United States patents are incorporated herein by reference with respect to their description of such elastomers and their synthesis. The elastomers used will be substantially random. Solution elastomers such as synthetic-polyisoprene may also be used. The solution elastomers used may be styrene-butadiene random copolymer or styrene-isoprene random copolymer with about 10 to about 40% by weight of bound styrene content. The Mooney viscosity of the said solution elastomer may be in the range of about 15 to about 120 Mooney as measured per ML 1+4 at 100° C. The solution elastomer may be used from about 5 to about 70 parts, more preferably from 10 to about 60 parts, most preferably from 20 parts to about 40 parts by weight of total thermoplastic elastomer blend composition. The styrene butadiene rubber will preferably have a vinyl content which is within the range of 10 to 60%.

The solution diene rubbers that are particularly useful in this invention for use as crosslinkable elastomers are the modified or coupled elastomers, such as copolymers of styrene and diene selected from butadiene and isoprene and the living polymer, before terminating the polymerization, modified with tin or silicon. Such modified elastomers may also be for example styreneibutadiene copolymers and styrene/isoprene/butadiene ter-polymers. Homopolymers of diene may also be employed, but it is more preferred to have the styrene be present as a co-monomer. Copolymers of isoprene and 1,3-butadiene may also be used.

An important characteristics of the coupled elastomer, particularly the tin-modified elastomers, is that a substantial portion, preferably at least 40%, and more generally in the range of about 60 to about 85% of the tin (Sn) bonds or silicon (Si) bonds are bonded to the diene units of the styrene/diene copolymer, which may be referred herein as tin-dienyl or silicon-dienyl bond, for example butadienyl bonds in case of butadiene terminating with the tin (or silicon).

A copolymer-coupled elastomer may be prepared by copolymerization of styrene with 1,3-butadiene and/or isoprene in an organic solution with an alkyl lithium catalyst. A co-catalyst or catalyst modifier may also be used. Such polymerization methods are well known to those skilled in this art. After formation of the copolymer elastomer, but while the catalyst is still active and, therefore, while the copolymer is still considered a living or live polymer that is capable of further polymerization, the polymerization can be terminated by reacting the live polymer with a tin or silicon compound such as tin tetrachloride. This taking into account that the valence of tin is four, typically the modified copolymer is considered coupled or capped, with an accompanying molecular weight or viscosity jump or increase, and the modified copolymer being in what is sometimes called as a star shaped, or star configured, coupled elastomer. Coupling compounds similar to tin tetrachloride with a lower or higher valence may also be used to obtain an architecture that is higher or lower in the average number of arms that are obtained from a tin tetrachloride that has a valence of four. A tin coupled copolymer elastomer can also be obtained via coupling with an organo tin compound such as for example alkyl tin chloride, dialkyl tin chloride, and trialkyl tin chloride, resulting in variations in the tin coupled polymer with the trialkyl tin monochloride yielding simply a tin terminated copolymer.

Some examples of preparation of such coupled elastomers is further given in following Journal Articles: "Solution-Polymerized Rubbers with Superior Breakdown Properties," Journal of Applied Polymer Science Vol. 14, PP 1421–1432 (1970), "Tin Coupled SBRs: Relationship between Coupling Type and Properties," Paper No 78, Presented at 148$^{th}$ Meeting of the Rubber Division, American Chemical Society, Cleveland, Ohio, Oct. 17–20, 1995, and "Newly Developed Solution SBRs for Low Rolling Resistance Tire," RCT 1990 V 63 #1, P 8–22, which are incorporated herein by reference.

Some examples of modified or coupled solution elastomers such as tin or silicon-coupled with several variations are given in U.S. Pat. No. 6,090,880, U.S. Pat. No. 5,064,910, U.S. Pat. No. 4,553,578, U.S. Pat. No. 4,444,236, U.S. Pat. No. 5,362,794, U.S. Pat. No. 5,677,399, U.S. Pat. No. 5,786,441, U.S. Pat. No. 6,008,295, U.S. Pat. No. 6,252,007, and U.S. Pat. No. 6,228,908, which are incorporated herein by reference, as they may also be used in thermoplastic elastomers as disclosed in this invention.

The rubbery elastomers that can further be used in the soft thermoplastic composition of this invention include ethylene-propylene-diene rubber, butyl rubber, halobutyl rubber, ethylene-co-octene elastomer, halogenated rubber copolymers of p-alkylstyrene and at least one isomonoolefin having from 4 to 7 carbon atoms, nitrile rubber, and the hydrogenated nitrile rubber The nitrile rubber or its hydrogenated version may contain the acrylonitrile units in the range of about 5 to about 50% by weight of the said rubber, and will not be very high as to maintain the rubber like elasticity. Such elastomers are commercially available from Zeon Chemicals. It may be necessary to use a compatibilizer to compatibilize the polar nitrile or hydrogenated nitrile rubber with the relatively non-polar block copolymer. The compatibilizer may consist of a combination of polar and non-polar segments. It is preferred that the compatibilizer is elastomeric in nature so that it has high extensibility and retractibility. A polyamide-block-ether elastomer may be used to compatibilize the nitrile rubber or its hydrogenated derivative with the highly saturated block copolymer. The polyamide elastomers such as the polyamide-block-ether elastomer are commercially available from Atofina and are available under the trade name Pebax.

The diene containing elastomer may be dynamically vulcanized with hydrosilation curing systems in presence of the block copolymer and the thermoplastic resins. U.S. Pat. No. 6,251,998, U.S. Pat. No. 6,169,145, U.S. Pat. No. 6,150,464, U.S. Pat. No. 6,147,160, U.S. Pat. No. 6,084,031, U.S. Pat. No. 5,672,660, U.S. Pat. No. 5,936,028, and U.S. Pat. No. 4,803,244 teach the methods and hydrosilation crosslinking systems that are useful and can be used in this invention, the teachings of which are incorporated herein as a reference.

The dynamic vulcanization of the crosslinkable diene elastomer in the presence of the block copolymer and a thermoplastic resin may also be carried-out by either grafting the crosslinkable elastomer with a carboxylic acid anhydride or using a crosslinkable elastomer copolymerized with a carboxylic acid anhydride, and vulcanizing the said elastomer with an amino silane. U.S. Pat. No. 6,448,343 teaches the dynamic curing of elastomers with the amino silane curing agents and is incorporated herein by reference.

U.S. Pat. No. 5,112,919 describes a process of crosslinking a polyolefin thermoplastic resin with with a silane and a free radical generator. The vinyl silane is grafted to the polyethylene with a free radical generator such as a peroxide and subsequently crosslinking the polyethylene with the aid of moisture. Typically longer curing times are required when polyolefins are crosslinked after the polyolefin articles are formed, particularly the crosslinking is performed below the melting point of the thermoplastic resin so as to retain the shape of the article. The teachings of the U.S. Pat. No. 5,112,919 are incorporated by reference for crosslinking the thermoplastic resin during the dynamic vulcanization of the diene rubber for blending with the saturated block copolymer. In this invention, it will be demonstrated that the diene containing elastomer can also be crosslinked with a vinyl silane and moisture crosslinking system during the melt mixing step with the polyolefin resin, which can be further blended with the saturated block copolymer. The vinyl silane, catalyst and a free radical generator containing cure systems are available from Crompton Corporation under the trade name XLPEARL dry silane masterbatches, and can be used in this invention.

The highly saturated elastomers that may be used in this invention are selected from the group of styrene-ethylene butylene-styrene (SEBS), styrene-ethylene propylene-styrene (SEPS), hydrogenated polybutadiene, hydrogenated polyisoprene, hydrogenated styrene-isoprene random copolymer, styrene-ethylene propylene (SEP) block copolymer, styrene-ethylene ethylene propylene-styrene (SEEPS) and hydrogenated styrene-butadiene random copolymer. The hydrogenation of random diene copolymers are described by authors E. W. Duck, J. R. Hawkins, and J. M. Locke, in Journal of the IRI, 6, 19, 1972, which may be used as the highly saturated elastomer in this invention and is incorporated herein as a reference. The saturated triblock polymers, SEBS and SEPS, with styrene end blocks are also used in this invention as the saturated elastomers. SEBS and SEPS are obtained on the hydrogenation of triblock copolymers of styrene and butadiene or styrene and isoprene and are known to be commercially available. Some commercial available examples of such elastomers include Kraton® G series polymers. U.S. Pat. No. 3,686,364 and U.S. Pat. No. 3,865,776 give some examples of block copolymers that may be used in the practice of this invention and are incorporated herein by reference. It is highly preferred that the highly saturated elastomer to be SEBS having a bound styrene content that is within the range of 15 weight percent to about 40 weight percent.

It is possible to use the saturated block copolymers that are modified versions of SEBS. Such modified block copolymers additionally have a substantial number of styrene units that are randomly distributed in the rubber mid-blocks of ethylene and butylene. These modified saturated block copolymers are supplied under Kraton® 'A' series. Saturated block copolymers grades as mentioned in TPE 2003 RAPRA Conference Proceedings, Brussels, Belgium, Sep. 16–17, 2003, Paper 18, Page 157, and Paper 21, page 181 may also be used and are incorporated herein by reference.

Hydrogenated diblock elastomers of styrene and butadiene or styrene and isoprene can also be used as the highly saturated elastomers even though triblock elastomers are highly preferred. The highly saturated elastomers as used in this invention means that at least 75 percent of the original double bonds of the isoprene or butadiene units present prior to hydrogenation have been saturated by hydrogenation, more preferably at least 90 percent and most preferably 95 percent of the original double bonds have been saturated.

The highly saturated elastomer may be used from about 5 to about 90 parts, more preferably from 15 to about 70 parts, most preferably from about 25 parts to about 60 parts by weight of total thermoplastic elastomer blend composition.

The thermoplastic elastomer blend compositions formed by blending a polyolefin and/or polystyrene resin, a substantially random elastomer, and a highly saturated elastomer may be overmolded on a hard thermoplastic resin substrate where the thermoplastic resin has a glass transition temperature or a melt transition temperature of at least 70° C. as measured in a differential scanning calorimeter at a heating rate of 10° C. per minute. The hard substrate may be selected from thermoplastic resins selected from the group consisting of polypropylene, polyethylene, polycarbonate, polybutylene terpthalate, polyamides such as nylon 6, nylon 11, acrylonitrile-butadiene-styrene copolymer (ABS), styrene-acrylonitrile copolymer, polyacetal, and the like. The hard substrate can also be a metal.

The soft thermoplastic elastomer blend composition will also contain a processing oils, such as a paraffinic oil and/or a naphthenic oil. The oil will typically be present at a level within the range of 15 to about 200 parts by weight. The oil will more typically be present at a level within the range of about 20 to 150 parts by weight and will preferable be present at a level which is within the range of 20 to 70 parts by weight. The soft thermoplastic elastomer blend composition will preferably contain a processing oil. Examples of such oils that can be used include Paralux™ process oils 701R, 1001R, 2401R, 6001R, from Chevron and the like. It is preferred to use an oil with a high flash point for better retention of the oil. Naphthenic oils are preferred with for use in blends having a relatively high styrene content and paraffinic oils are preferred for utilization in conjunction with blends having a relatively low styrene content. In this invention, elastomers and rubbers are used interchangeably. The terms, vulcanized, crosslinked, and cured are also used interchangeably herein.

The soft thermoplastic elastomer blend composition may also contain reinforcement or fillers selected from the group consisting of talc, clay, calcium carbonate, silica, carbon black, and wollastonite.

The hard thermoplastic resin substrate may also contain a reinforcement selected from the group consisting of talc, wollastonite, calcium carbonate, glass fibers, glass spheres, and silica.

The preparation of the soft-thermoplastic elastomer composition may be carried out in a continuous mixer, or a combination of a continuous mixer and a batch mixer. When a batch mixer is used, the discharged and uncrosslinked blend may be fed through a single screw-extruder and pelletized. When a continuous mixer is used, the blend may be pelletized after discharging from the twin-screw extruder. The dynamic vulcanization of the unsaturated diene elastomer or rubbery polymer or elastomer will be preferably carried out in a continuous mixer such as a twin-screw extruder or a Farrel continuous mixer.

The soft-thermoplastic elastomer composition can be comprised of a continuous matrix phase of the thermoplastic resin with the rubbery elastomer and the highly saturated elastomer being present as dispersed phases. In another embodiment of this invention the rubbery polymer, the thermoplastic resin, and the highly saturated elastomer can all be present in the soft-thermoplastic elastomer as co-continuous phases. In still another embodiment of this invention the highly saturated elastomer can be present as the continuous matrix phase with the thermoplastic resin and the rubbery elastomer being present as dispersed phases.

A crosslinking agent such as peroxide may be used to crosslink the elastomer, or SEBS or both to modify the mechanical properties and improve oil resistance and compression set. If polypropylene resin is used, there may be a further reduction in the melt viscosity due to the reduction of the molecular weight of the polypropylene. If a polyethylene resin is used, the resin may also be crosslinked. The resistance of the overmolded thermoplastic elastomer composition to the paraffinic oils may be improved by increasing the styrene content in the solution styrene-co-butadiene random copolymer or solution styrene-co-isoprene random copolymer that may be used for the thermoplastic elastomer composition, more preferably from 10 to about 40 percent by weight of the said solution SBR or solution styrene-co-isoprene random copolymer.

It is possible to pre-blend the solution diene elastomer with the polypropylene in the first mixing step and optionally crosslinking the diene rubber fully or partly. It is then possible to mix the blend of the fully or partially crosslinked diene rubber and polypropylene formed in the first step with the highly saturated elastomer in a second mixing step. This two-step mixing sequence may ensure crosslinking of only the diene rubber phase and not the highly saturated elastomer, particularly when the crosslinking agent is a peroxide-based curing agent. The dynamic vulcanization of the rubbery elastomer is preferably carried out in a continuous process, more particularly in a twin-screw extruder. The dynamic vulcanization of the unsaturated diene elastomer or rubbery polymer or elastomer will be preferably carried out in a continuous mixer such as a twin-screw extruder or a Farrel continuous mixer.

Thermoplastic elastomer compositions may be further modified with compounds or compatibilizers that contain functional and polar groups that have high affinity towards the thermoplastic being overmolded. Such compounds or compatilizers are well known to those skilled in this art. Few examples of the compatibilizers include maleated-ethylene propylene diene rubber, ethylene-co-ethyl or butyl acrylate-co-glycidyl methacrylate, maleated polypropylene, chlorinate-polypropylene, ethylene-co-acrylic acid and the like. The functional group containing compounds enhance the adhesion between the overmolded soft-thermoplastic elastomer and the hard thermoplastic resin substrate.

The overmolding of the soft thermoplastic composition can be achieved by a two shot or multi-component injection molding process or co-injection molding process. Such processes are generally described in "Special Technologies for Injection Moulding of TPE", Peter Pokomy, Engel Maschinebau GmbH, TPE 2000, 6 & 7$^{th}$ Mar. 2000, Paper 17, Amsterdam, conference proceedings. The teachings of this reference are incorporated herein by reference. The soft-thermoplastic elastomer overmolded onto the hard thermoplastic resin substrates are also described in "New Horizons in Thermoplastic Elastomers," Stephen J. Duckworth, M. A. Hanna Engineered Materials Europe, TPE 2000, 6 & 7$^{th}$ Mar. 2000, Paper 5, Amsterdam, and the teaching thereof are also incorporated herein by reference.

The soft overmolding can also be accomplished by insert injection molding carried out in two steps. In the first step, the thermoplastic substrate is molded and is subsequently inserted in another cavity for overmolding in the next step into the soft thermoplastic elastomer. The soft thermoplastic elastomers can be overmolded on a rigid metal substrate by insert injection molding processes.

The soft thermoplastic elastomer composition can also be processed by either an extrusion or an injection molding process and the formed soft sleeve can be slipped onto the solid thermoplastic or metal substrate.

The thermoplastic elastomer blends may also contain antiozonants and oxidants that are known to a rubber chemist of ordinary skill. The antiozonants may be physical protectants such as waxy materials that come to the surface and protect the part from oxygen or ozone or they may chemical protectors. The chemical protectors may be selected from the class of styrenated phenols, butylated octylated phenol, butylated di(dimethylbenzyl)phenol, p-phenylenediamines, butylated reaction products of p-cresol and Dicyclopentadiene (DCPD, polyphenolic anitioxidants, hydroquinone derivatives, quinoline, diphenylene antioxidants and thioester antioxidants and the like and their blends. Some representative trade names of suitable products include Wingstay® S antioxidant, Wingstay® T antioxidant, Polystay® C antioxidant, Polystay® 100 antioxidant, Polystay® 100 AZ antioxidant, Polystay® 200 antioxidant, Wingstay® L antioxidant, Wingstay® LHLS antioxidant, Polystay® K antioxidant, Polystay® 29 antioxidant, and Wingstay® SN-1. The antioxidants and antiozonants used will preferably be non-staining and non-migratory. For applications that require non-black pigmentation or compositions where the natural color may be desired, carbon black may not be used and above mentioned antioxidants and antiozonant may be used instead. It is important that the said elastomer contains a significant portion of the antioxidant and antiozonant and/or carbon black (whenever used) in the said blends.

For providing additional stability against UV radiation, hindered amine light stabilizers (HALS) and UV absorbers may be also used in the thermoplastic elastomer composition. A skilled person is aware of such stabilizers. For example, Tinuvin® RTM 123, 144, 622, 765, 770 and 780, and Chemisorb® TTM-944 and the like may be employed. These kinds of UV stabilizers are available from Ciba Specialty Chemicals and Cytex Industries.

When the solution elastomeric phase is fully or partially cured in the thermoplastic elastomer compositions, curatives of the known art may be employed. The curing may be accomplished by dynamic vulcanization, wherein the rubber phase is generally crosslinked simultaneously as it is being mixed with the thermoplastic resin. The curatives may be selected from sulfur based, peroxide based, or phenolic based curatives. U.S. Pat. No. 3,758,643, U.S. Pat. No. 3,806,558, U.S. Pat. No. 5,051,478, U.S. Pat. No. 4,104,210, U.S. Pat. No. 4,130,535, U.S. Pat. No. 4,202,801, U.S. Pat. No. 4,271,049, U.S. Pat. No. 4,340,684, U.S. Pat. No. 4,250,273 4,927,882, U.S. Pat. No. 4,311,628 and U.S. Pat. No. 5,248,729 teach the type of curing or crosslinking agents and methods that can be utilized and the teaching of these references are incorporated herein by reference.

When sulfur based curing agents are employed for curing the diene containing solution elastomer, accelerators and cure activators may be used. Accelerators are used to control the time and/or temperature required for dynamic vulcanization and to improve the properties of the thermoplastic composition. In one embodiment, a single accelerator system may be used, i.e., primary accelerator. The primary accelerator(s) may be used in total amounts ranging from about 0.5 to about 4, preferably about 0.8 to about 1.5 phr (parts by weight per hundred parts by weight of rubber). In another embodiment, combinations of a primary and a secondary accelerator might be used with the secondary accelerator being used in smaller amounts, such as from about 0.05 to about 3 phr, in order to activate and to improve the properties of the thermoplastic elastomer composition. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Vulcanization retarders might also be used. Suitable types of accelerators that may be used in the present invention are amines, disulfides, guanidines, thioureas, thiazoles, thiurams, sulfenamides, dithiocarbamates and xanthates. Preferably, the primary accelerator is a sulfenamide. If a second accelerator is used, the secondary accelerator is preferably a guanidine, dithiocarbamate or thiuram compound. Certain processing aids and cure activators such as stearic acid and zinc oxide (ZnO) may also be used. When peroxide based curing agents are used, coactivators or coagents that are known to a rubber chemist of ordinary skill may be used in combination with the peroxides. These coagents may include trimethylolpropane triacrylate (TMPTA), trimethylolpropane trimethacrylate (TMPTMA), triallyl cyanurate (TAC), triallyl isocyanurate (TAIC), and the like. The peroxide crosslinkers and the coagents that may be employed for partial or complete dynamic vulcanization can be selected from the journal publication, "Peroxide Vulcanization of Elastomer", Vol. 74, No 3, July–August 2001, the teachings of which are incorporated here by reference.

Hydrosilation crosslinking may also be employed to crosslink the diene-containing rubbery elastomer. The thermoplastic elastomer containing a diene containing crosslinkable elastomer will preferably be crosslinked with a hydrosilation system wherein the hydrosilation catalyst is selected from the group consisting of a platinum, platinum zero compounds complexed with compounds selected from carbon monoxide, fumarates, phosphines, di-or tetravinyltetramethyldisiloxanes, palladium, chloroplatinic acid, platinum chloride complexes in alcohols, and rhodium, that is complexed with a member selected from divinyltetramethyldisiloxanes or cyclovinylmethylsiloxanes wherein additional divinylsiloxanes or polyvinylmethylcyclosiloxanes are present, wherein the catalyst or catalyst complexed compounds are incorporated on the block copolymer, crosslinkable elastomer, and/or oil, and are prefereably present from about 0.0015 to about 1 parts metal by weight of the. crosslinkable elastomer. The hydrosilation agent will most preferably be tetrakis(dimethylhydrogensiloxy)silane. The hydrosilation catalyst will most preferably be a platinum zero compound that is complexed with carbon monoxide and polyvinylmethylcyclicsiloxanes to give a platinum carbonyl complex in cyclic methylvinylsiloxanes.

The preferred range of composition will be from about 2 to about 60 parts of the thermoplastic resin, from about 5 to about 90 parts of the rubbery polymer, and from about 5 to about 90 parts of the highly saturated elastomer, and from about 15 to about 600 parts of oil. The more preferred range of composition will be from about 5 to about 40 parts of the thermoplastic resin, from about 20 to about 70 parts of the rubbery polymer, and from about 20 to about 70 parts of the highly saturated elastomer, and from about 50 to about 400 parts of oil. The most preferred range of composition will be from about 10 to about 30 parts of the thermoplastic resin, from about 30 to about 55 parts of the rubbery polymer, and from about 30 to about 55 parts of the highly saturated elastomer, and from about 75 to about 350 parts of oil.

When the elastomer is at least partially crosslinked, the degree of crosslinking may be measured by dissolution of the blend in a solvent for specified duration, and using certain calculations to compensate for the insoluble or resin portion and then calculate % gel or unextractable rubber.

The percent gel would normally increase with increasing crosslinking level. These techniques are well defined and established and are known to the persons that are skilled in this art. The percent gel content in the thermoplastic blends, more so in the TPVs may be anywhere in the range of about 5% to 100%.

The soft thermoplastic elastomer compositions overmolded on a hard thermoplastic resin substrate may be used in a shaving razor, toothbrush, pen grips, power tools, kitchen appliances, utensils, and keypads.

The Young's modulus of the soft thermoplastic elastomer blend composition as measured by the initial slope of the stress strain curve in a tensile measurement such as ASTM D 638 will be preferably at least 10 MPa less than the Young's modulus of the hard substrate.

This invention is illustrated by the following examples that are merely for the purpose of illustration and are not to be regarded as limiting the scope of the invention or the manner in which it can be practiced. Unless specifically indicated otherwise, parts and percentages are given by weight.

Table 1 lists thermoplastic elastomer masterbatch compositions that were prepared with a saturated elastomer Kraton® G 1650, a polypropylene random copolymer, Atofina 7823 MZ, a solution polymerized styrene-butadiene random copolymer elastomer, Solflex® 2515 or EPDM elastomer, Royalene® IM 7100, from Crompton Corporation, and talc partitioning agent in the first step mixing process. Solflex® 2515 is a low vinyl (about 15%), and about 25 weight % bound styrene containing solution polymerized random styrene-butadiene copolymer produced by The Goodyear Tire & Rubber Company. Polypropylene 7823M is the isotactic random copolymer of propylene and another olefin comonomer, supplied by Atofina and is prepared with Zieglar Natta catalyst (non-metallocene catalyst) technology, with about 6 weight % of random comonomer units, and a melt flow rate of about 30 g/10 minutes at 230° C./2.16 Kg load, and a melt point transition (peak) temperature range of about 145–155° C. Kraton® G1650 is a medium molecular weight saturated SEBS elastomer from Kraton Polymers. The weight average (Mw) and number average (Mn) molecular weights of Kraton® G1650 as measured by Size Exclusion Chromatography as 55,000 and 52,000 g/mole respectively. In Examples 1–4, the SBR or EPDM content of the masterbatch is higher than the SEBS content.

TABLE 1

Masterbatch Composition in Weight %

| No | 1 | 2 | 3 | 4 |
|---|---|---|---|---|
| Solflex 2515* | 52.89 | 52.89 | 52.89 | — |
| Royalene ® IM 7100* | — | — | — | 52.89 |
| Atofina 7823 Mz | 27.11 | 27.11 | 27.11 | 27.11 |
| Kraton ® G1650 | 20 | 20 | 20 | 20 |
| Total | 100 | 100 | 100 | 100 |

*amount contains about 7.53 phr (parts per hundred SBR or EPDM rubber) of talc partitioning agent Soft and oil extended thermoplastic elastomers were prepared with compositions given in Table 2. Masterbatch compositions of Examples 1, 2, 3, and 4 were used to prepare Examples 7, 8, 9, and 10 respectively as given in Table 2. Additionally, naphthenic oil was added to oil extend the elastomers and a crosslinking agent was added to crosslink the SBR or EPDM rubber molecules. The masterbatch and soft and oil extended formulations were prepared in a Coperion ZSK25, 25 mm co-rotating, twin-screw extruder with an L/D of 48 and 12 barrels. Operating conditions of 300 RPM, 180° C., and 20 lbs/hour were used to prepare the masterbatch. Operating conditions of 300 RPM, 200° C., barrel temperatures and throughput 14.1 lb/hour were used to prepare the soft and oil extended formulations. The injection point of the oil was barrel 7 and the addition point for all other ingredients was the main feed hopper of the extruder.

TABLE 2

Soft and Oil Extended TPE Formulations
Compositions in Weight % with Low SEBS Content

| | No | | | | | |
|---|---|---|---|---|---|---|
| | 5+ | 6+ | 7 | 8 | 9 | 10+ |
| Solflex 2515* | — | — | 34.99 | — | — | — |
| Solflex 2515** | — | — | — | 37.37 | — | — |
| Solflex 2515*** | — | — | — | — | 35.12 | — |
| Royalene ® IM 7100** | — | — | — | — | — | 37.37 |
| Atofina 7823 Mz | 17.93 | 17.93 | 17.93 | 17.27 | 17.89 | 17.27 |
| Kraton ® G1650 | 48.22 | 13.23 | 13.23 | 12.76 | 13.22 | 12.76 |
| Kraton ® D 1101**** | — | 34.99 | — | — | — | — |
| Renoil 471***** | 33.85 | 33.85 | 33.85 | 32.6 | 33.77 | 32.6 |
| Total | 100 | 100 | 100 | 100 | 100 | 100 |

+Control
*Amount incorporates 7.53 phr of talc
**Amount incorporates 7.53 phr of talc, 9.23 phr of Poly-dispersion WBC-559P Firm 50 C of Rhein Chemie (65% SP 1055 Phenolic Curative of Schenectady Chemicals), 1.5 phr of Zinc Oxide powder, and 1.02 phr of anhydrous Stannous Chloride from Aldrich Chemicals
***Amount incorporates 7.53 phr of talc and 0.625 phr of a peroxide curing agent (Vulcup ® 40 KE of Geo Specialty Chemicals)
****Styrene-Butadiene-Styrene (SBS) non-hydrogenated triblock copolymer of Kraton Polymers
*****Clear Naphthenic oil from Renkert Oil, PA.

The physical properties of the soft TPE formulations of Table 2 were tested and are given below in Table 3.

Measurement of the physical properties of the compositions disclosed in this invention were performed in accordance with the following ASTM Standard Test Methods; Durometer hardness D2240-00, tensile properties D412-98a test method A, tear strength D624-00, flexural properties D790-00, compression set D395-01 method B, and effect of liquids D471-98.

TABLE 3

Properties of Soft and Oil Extended TPE Formulations

| | No | | | | | |
|---|---|---|---|---|---|---|
| | 5+ | 6+ | 7 | 8 | 9 | 10+ |
| Shore A Hardness | 63 | 66 | 53 | 62 | 56 | 64 |
| Tensile Strength (Mpa) | 5.7 | 4.7 | 2.3 | 3.5 | 3.4 | 5.4 |
| Tear Strength (N/mm) | 37.9 | 30.9 | 18.5 | 13.0 | 13.2 | 23.1 |
| Flexural Modulus (Mpa) | 26.9 | 22.2 | 15 | 16.8 | 12.4 | 18.8 |
| % Compression Set B | | | | | | |
| @ 23 C | 21 | 25 | 39 | 13 | 14 | 18 |
| @ 70 C | 95 | 97 | 87 | 71 | 63 | 63 |
| % Weight Gain IRM Oil 903 | | | | | | |
| @ 70 C | 75 | 73 | 81 | 51 | 58 | 81 |

+Control

The TPE formulations of Table 3 were insert overmolded on a cylinderical rigid polypropylene substrate to simulate a soft pen-grip. The TPEs molded well and had a good surface appearance. The oil in the uncrosslinked SBR containing Example 7 appeared to be leaching on the surface. Upon crosslinking of the SBR phase as done in Examples 8 and 9, the leaching was not seen. The soft TPEs prepared with crosslinked SBR were functional and had adequate strength and excellent appearance. The soft portion of the overmolded TPE were immersed in a beaker containing water. The surface of the immersed TPEs were rubbed against the thumb and two fingers that constitute a grip. The SBR containing TPEs Examples 7, 8, and 9 had the best wet grip characteristics, that was followed by Examples 10, 6, and 5 in the aforementioned order. The Examples 8 and 9 that contain SBR that was crosslinked with phenolic and peroxide curing agents respectively, had the lowest weight gain (i.e. best oil resistance) and low compression set. Good oil resistance is required for grips used in power tools, hand tools, kitchen utensils, and pens. Also, good wet grip character is needed in many grip applications that require water contact of the grip.

Transmission Electron Microscopy (TEM) was performed on the samples of Example 8 with proper staining techniques to identify the three polymeric phases. The polypropylene phase was observed as the continuous matrix phase. The SEBS domains were predominantly observed to be surrounding the crosslinked SBR domains and were dispersed in the polypropylene. The majority of crosslinked SBR domains were greater than 1 micron and few crosslinked SBR domains were less than 0.5 microns. This demonstrates that in an oil extended formulation containing SEBS, crosslinked SBR, and polypropylene, a low compression set, good oil resistance, and good wet grip characteristic thermoplastic elastomer is obtained when the polypropylene phase is a continuous matrix phase.

Masterbatch as given in Table 4 were prepared where the SEBS content was higher than the SBR or EPDM content by using similar methodology as in Examples 1–4.

TABLE 4

Masterbatch Composition in Weight %

| No | 11 | 12 |
|---|---|---|
| Solflex 2515* | 29.4 | — |
| Royalene ® IM 7100* | — | 29.4 |
| Atofina 7823 Mz | 16.1 | 16.1 |
| Kraton ® G1650 | 54.5 | 54.5 |
| Total | 100 | 100 |

*amount contains about 7.53 phr (parts per hundred) of talc partitioning agent

Soft and oil extended TPE formulations were prepared as given in Table 5 by using similar methodology as in Examples 5–10. Masterbatch compositions of Examples 11 and 12 were used to prepare Examples 15 and 16 respectively as given in Table 4. Additionally, naphthenic oil, and crosslinking agents were added to oil extend the elastomers and crosslink the SBR or EPDM rubber molecules. The SEBS content in the TPE formulations was high and polypropylene content was low.

TABLE 5

Soft and Oil Extended TPE Formulations Compositions in Weight % with High SEBS Content

| No | 13+ | 14+ | 15 | 16+ |
|---|---|---|---|---|
| Solflex 2515* | — | — | 21.25 | — |
| Royalene ® IM 7100* | — | — | — | 21.25 |
| Atofina 7823 Mz | 10 | 10.7 | 10.5 | 10.5 |
| Kraton ® G1650 | 52 | 36.3 | 35.5 | 35.5 |
| Kraton ® D 1101 | — | 19.6 | — | — |
| Renoil 471 | 38 | 33.4 | 32.75 | 32.75 |
| Total | 100 | 100 | 100 | 100 |

+Control
*Amount incorporates 7.53 phr of talc, 9.23 phr of Poly-dispersion WBC-559P Firm 50C of Rhein Chemie (65% SP 1055 Phenolic Curative of Schenectady Chemicals), 1.5 phr of Zinc Oxide powder, and 1.02 phr of anhydrous Stannous Chloride from Aldrich Chemicals The soft TPE formulations of Table 5 were tested for physical properties and results are given in Table 6.

TABLE 6

Properties of Soft and Oil Extended TPE Formulations

| No | 13+ | 14+ | 15 | 16+ |
|---|---|---|---|---|
| Shore A Hardness | 51 | 55 | 51 | 54 |
| Tensile Strength (Mpa) | 5.4 | 6.1 | 4.2 | 4.6 |
| Tear Strength (N/mm) | 31.5 | 27.6 | 17.6 | 25.4 |
| Flexural Modulus (Mpa) | 17.5 | 14.1 | 7.5 | 8.5 |
| % Compression Set B | | | | |
| @ 23 C. | 18 | 17 | 13 | 12 |
| @ 70 C. | 102 | 98 | 92 | 91 |
| % Weight Gain IRM Oil 903 | | | | |
| @ 70 C. | 150 | 94 | 82 | 118 |

+Control

The soft TPEs of Table 5 were insert overmolded in a two step injection molding process. The hard polypropylene insert was molded first. The insert was then placed in another cavity in the mold and the TPE formulations were overmolded in the second step. The soft TPEs prepared with crosslinked SBR were functional and had adequate strength and excellent appearance. The soft portion of the overmolded TPEs of Examples 13–16 were immersed in a beaker containing water. The surface of the immersed TPEs were rubbed against the thumb and two fingers that constitute a grip. The SBR containing TPE of Example 15 had the best wet grip characteristics, that was followed by Example 16, 14, and 13, in the aforementioned order. The Example 15 that contained crosslinked SBR that was crosslinked with phenolic curing agent, had the lowest weight gain (i.e. best oil resistance) and a low compression set. Good oil resistance is required for grips used in power tools, hand tools, kitchen utensils, and pens. Also, good wet grip character is needed in many grip applications that require water contact of the grip, such as toothbrush and shaving handles.

Transmission Electron Microscopy (TEM) was performed on the sample of Example 15 that contained crosslinked SBR with proper staining techniques to identify the three polymeric phases. The SBR phase was observed to be co-continuous phase with the polypropylene and SEBS phases. This demonstrates that a useful oil extended TPE formulation can be prepared with crosslinked SBR, SEBS, and polypropylene where the SBR phase is not the dispersed phase in a co-continuous matrix of polypropylene and SEBS, and the SBR is co-continuous with SEBS and polypropylene.

Table 7 and Table 8 give the masterbatch and the oil extended TPE formulations that were prepared with a higher molecular weight SEBS grade, Kraton G® 1651 that were prepared similarly per the procedure as described in Examples 1–10 respectively. The weight average (Mw) and number average (Mn) molecular weights of Kraton® G 1651 were measured by Size Exclusion Chromatography as 151,000 and 146,000 g/mole respectively. The SEBS to SBR ratio was varied.

TABLE 7

Masterbatch Composition in Weight %

| | No | | | | |
|---|---|---|---|---|---|
| | 17 | 18 | 19 | 20 | 21 |
| Solflex 2515* | 21.2 | 37.05 | 53.35 | — | — |
| Royalene ® IM 7100 | — | — | — | 21.2 | 53.35 |
| Atofina 7823 Mz | 21.9 | 22.21 | 22.57 | 21.9 | 22.57 |
| Kraton ® G1651 | 56.9 | 40.74 | 24.08 | 56.9 | 24.08 |
| Total | 100 | 100 | 100 | 100 | 100 |

*amount contains about 7.53 phr (parts per hundred) of talc partitioning agent Masterbatch of Examples 17, 18, 19, 20, and 21 were used to prepare the TPE compositions of Examples 25, 26, 27, 28, and 29 respectively, wherein the respective elastomers (SBR or EPDM) were crosslinked with identical phenolic curing system.

TABLE 8

Soft and Oil Extended TPE Formulations with Kraton ® G 1651: Compositions in Weight %

| | No | | | | | | | |
|---|---|---|---|---|---|---|---|---|
| | 22+ | 23+ | 24+ | 25 | 26 | 27 | 28+ | 29+ |
| Solflex 2515* | — | — | — | 16 | 27.5 | 39 | — | — |
| Royalene ® IM 7100♦ | — | — | — | — | — | — | 16 | 39 |
| Atofina 7823 Mz | 15 | 15 | 15 | 15 | 15 | 15 | 15 | 15 |
| Kraton ® G1651 | 55 | 39 | 16 | 39 | 27.5 | 16 | 39 | 16 |
| Kraton ® D 1101 | — | 16 | 39 | — | — | — | — | — |
| Renoil 471 | 30 | 30 | 30 | 30 | 30 | 30 | 30 | 30 |
| Total | 100 | 100 | 100 | 100 | 100 | 100 | 100 | 100 |

+Control
*Amount incorporates 7.53 phr of talc, 9.23 phr of Poly-dispersion WBC-559P Firm 50 C of Rhein Chemie (65% SP 1055 Phenolic Curative of Schenectady Chemicals), and 1.5 phr of Zinc Oxide powder.
♦Amount incorporates 9.23 phr of Poly-dispersion WBC-559P Firm 50 C of Rhein Chemie (65% SP 1055 Phenolic Curative of Schenectady Chemicals), and 1.5 phr of Zinc Oxide powder.

TABLE 9

Properties of Soft and Oil Extended TPE Formulations with Kraton ® G1651

| | No | | | | | | | |
|---|---|---|---|---|---|---|---|---|
| | 22+ | 23+ | 24+ | 25 | 26 | 27 | 28+ | 29+ |
| Shore A Hardness | 60 | 62 | 64 | 60 | 61 | 60 | 62 | 63 |
| Tensile Strength (Mpa) | 8.8 | 5.8 | 6.2 | 8 | 6.3 | 3.9 | 6.7 | 4.6 |
| Tear Strength (N/mm) | 24.9 | 25.2 | 31.2 | 23.8 | 18.4 | 13.3 | 25.5 | 21.8 |
| Flexural Modulus (Mpa) | 8.7 | 12.9 | 15.1 | 11.7 | 15.2 | 12.1 | 12.1 | 13.2 |
| % Compression Set B | | | | | | | | |
| @ 23 C | 7 | 10 | 13 | 5 | 6.5 | 6.6 | 12 | 15 |
| @ 70 C | 44 | 59 | 88 | 37 | 33 | 27 | 42 | 39 |
| % Weight Gain IRM Oil 903 | | | | | | | | |
| @ 70 C | 127 | 114 | 106 | 86 | 68 | 56 | 97 | 88 |

+Control

The crosslinked SBR containing oil extended thermoplastic elastomer Examples 25, 26 and 27 have the lowest compression set and the lowest weight gain in IRM oil 903, when compared with the SBS or crosslinked EPDM or SEBS (sole rubber) containing thermoplastic elastomer compositions.

Transmission Electron Microscopy (TEM) was performed on the samples of Example 25, 26 and 27 that contained crosslinked SBR with proper staining techniques to identify the three polymeric phases. The three examples contained polypropylene phase as a continuous phase with small and dispersed domains of SEBS and large and dispersed domains of crosslinked SBR. The majority of domains of SEBS were greater than 0.1 microns and very few domains of SEBS were greater than 2 microns. The majority of domains of crosslinked SBR were greater than 2 microns and very few domains of crosslinked SBR were less than 0.5 microns. The polypropylene matrix or the continuous phase existed as thin, elongated areas that predominantly surrounded the dispersed domains of SEBS and crosslinked SBR. This demonstrates that a useful and oil extended TPE composition with low compression set and good oil resistance can be obtained with a high molecular weight SEBS, crosslinked SBR, and polypropylene, where the polypropylene phase is the continuous phase and the SEBS and crosslinked SBR are the dispersed phases and the dynamic vulcanization of the rubbery elastomers is carried out in a continuous twin-screw extruder.

It is also possible to adjust the viscosity ratios of the SEBS, SBR, and polypropylene phases, lower polypropylene amounts to make the SEBS as the continuous or matrix phase and polypropylene as the dispersed phase. It is also possible to have the crosslinked SBR as either the dispersed phase in the matrix of SEBS with polypropylene also present as the dispersed phase or crosslinked SBR phase can be made co-continuous with the SEBS phase with polypropylene as the dispersed phase. It is also possible to adjust the viscosity ratios by using paraffinic oils that are more compatible with the polypropylene and SEBS than the crosslinked SBR. It is also possible to use a combination of naphthenic and paraffinic oils.

It is possible to first prepare a masterbatch of polypropylene and the SBR where SBR is dynamically crosslinked or vulcanized in a continuous process. The crosslinked SBR masterbatch can be then added to the SEBS, and oil in the second process step to make an oil extended crosslinked SBR, SEBS, and polypropylene containing composition. Following examples demonstrate this methodology.

TABLE 12

Characterization of Solution SBR Used for Making Crosslinked SBR Masterbatch

|  | SBR 3 | SBR 4 | SBR 5 |
|---|---|---|---|
| % Bound Styrene | 25.3 | 24.8 | 24.8 |
| % Vinyl Content | 51 | 14 | 14 |
| Mooney Viscosity (ML1 + 4 @ 100° C.) | 55 | 103 | 52 |
| Base Mw (g/mole) | 342,000 | 558,000 | 272,000 |
| Tg (° C.) Midpoint | −10 | −56 | −56 |

SBR 3 is a high vinyl-containing SBR. SBR 5 is essentially a lower molecular weight version of SBR 4.

Table 13 gives the composition of SBR masterbatches where SBR was dynamically vulcanized in a continuous twin-screw extruder in presence of polypropylene and no SEBS was added in the masterbatch. A peroxide curing agent from Akzo-Nobel was used to crosslink the SBR.

TABLE 13

Composition in Weight % of Crosslinked SBR Masterbatches Prepared by Dynamic Vulcanization

| No | 34 | 35 | 36 |
|---|---|---|---|
| SBR 3 | 59.35 | — | — |
| SBR 4 | — | 59.35 | — |
| SBR 5 | — | — | 59.35 |
| Trigonox ® 101-45B-pd (Akzo Nobel) | 0.92 | 0.92 | 0.92 |
| Talc | 7.77 | 7.77 | 7.77 |
| Polypropylene | 31.96 | 31.96 | 31.96 |
| (Atofina 3825, 30 MFI Isotactic Homopolymer) | | | |
| Total | 100 | 100 | 100 |

Table 14 lists the compositions of oil extended TPE formulations. Crosslinked SBR masterbatch of Examples 34, 35, and 36 were respectively used and blended with an SEBS, Oil, and polypropylene copolymer containing concentrate to form compositions of Examples 38, 39 and 40, respectively. The composition of Example 37 (control) that did not contain any crosslinked SBR and contained SEBS as the main rubber component was prepared by separate additions of the individual components. The compositions were melt mixed above the melting points of polypropylene and were subsequently molded and tested for physical properties.

TABLE 14

Oil Extended Soft TPE Compositions of SEBS and Crosslinked SBR Masterbatch Additions with SEBS

| No | 37⁺ | 38 | 39 | 40 |
|---|---|---|---|---|
| XL-SBR 3 | — | 21.14 | — | — |
| XL-SBR 4 | — | — | 21.14 | — |
| XL-SBR 5 | — | — | — | 21.14 |
| Kraton ® G 1651 | 60.41 | 39.27 | 39.27 | 39.27 |
| Polypropylene (Atofina 3825, 30 MFI Isotactic Homopolymer) | 11.21 | 11.21 | 11.21 | 11.21 |
| Polypropylene (Atofina 7823 Mz Isotactic Copolymer 30 MFI) | 10.69 | 10.69 | 10.69 | 10.69 |
| Renoil 471 | 14.96 | 14.96 | 14.96 | 14.96 |
| Talc | 2.73 | 2.73 | 2.73 | 2.73 |
| Total | 100 | 100 | 100 | 100 |

⁺Control

TABLE 15

Properties of Oil Extended Soft TPE Compositions of SEBS and Crosslinked SBR Masterbatch Additions with SEBS

| No | 37⁺ | 38 | 39 | 40 |
|---|---|---|---|---|
| Shore A Hardness | 85 | 83 | 83 | 84 |
| Tensile Strength (Mpa) | 17.4 | 12.2 | 10.2 | 11.2 |
| Tear Strength (N/mm) | 51.3 | 40.2 | 41.8 | 41 |
| Flexural Modulus (Mpa) | 57.7 | 46.2 | 48.6 | 47 |
| % Compression Set B | | | | |
| @ 23 C. | 23.5 | 19.7 | 21.4 | 20.2 |
| @ 70 C. | 53.3 | 41.3 | 43.7 | 43.5 |
| % Weight Gain IRM Oil 903 @ 70 C. | 67.5 | 49.2 | 53.8 | 56.6 |

⁺Control

The crosslinked SBR containing oil extended SEBS based thermoplastic elastomers have better compression set and oil resistance than the SEBS control. This demonstrates that the SBR may not be dynamically vulcanized in the presence of SEBS and a blend of crosslinked SBR and polypropylene can be added to SEBS and oil to prepare a useful soft thermoplastic elastomer composition.

It may also be preferred to use the random copolymers of styrene, butadiene, and isoprene or copolymers of isoprene and butadiene that are prepared with solution polymerization techniques to prepare blends of SEBS, polyolefin or polystyrene resins, oil, wherein the said elastomer is crosslinked. Such rubbery and unsaturated copolymers may be highly branched with varying vinyl content from about 5 to about 80 percent.

In following experiments, two non-oil extended compositions as disclosed in U.S. Pat. No. 4,927,882 were mixed in a continuous twin-screw extruder, ZSK-25.

TABLE 16

Composition in Parts

| No | 41⁺ | 42⁺ | 43 |
|---|---|---|---|
| Solflex ® 2515 | 100 | 100 | 100 |
| Kraton ® G1651 | 50 | 50 | 50 |
| Atofina 3825 polypropylene homopolymer 30MFI | 17 | 30 | 38.25 |
| Vulcup ® 40KE of Geo Specialty Chemicals | 0.625 | 0.625 | 0.625 |
| Kaolin Clay | 7.5 | 7.5 | 7.5 |
| Talc | 3.1 | 3.1 | 3.1 |

⁺Control

Operating conditions of 300 RPM, 180° C., and about 15 lb/hour were used. The SBR, SEBS and polypropylene were fed into the main feed hopper and peroxide curing agent was added at barrel 5. Samples of Examples 41 and 42 resulted in brittle and inhomogenous material with the extrudate breaking and were not suited to be made in a continuous manner. Samples from Example 43 that contained a larger polypropylene amount were smoother and more homogenous and were better suited to process in a continuous manner. This demonstrates that the compositions of prior art were not suitable to be processed in a continuous process. A continuous process used for dynamically vulcanizing the diene-containing rubbery elastomer is highly desirable for better control of morphology or rubber domains, control of temperature during crosslinking and to provide a better quality.

TPE compositions with two polypropylene variations were prepared per Table 17 with conditions of 150 RPM, 10 lb/hour and 185° C. barrel temperature in a ZSK-25 twin-screw extruder.

TABLE 17

Composition of Masterbatch in Weight %

| No | 44 | 45+ |
|---|---|---|
| Solflex ® 2515* | 27.7 | 27.7 |
| Kraton ® G1652 | 43.4 | 43.4 |
| Syndiotactic Polypropylene Copolymer Finaplas ® 1751 | 28.9 | — |
| Isotactic Polypropylene Copolymer (metallocene catalyst) Finacene ® EOD00-31 | — | 28.9 |
| | 100 | 100 |

*Include 7.5 phr talc, 13.85 phr of WBC-559P of Rhein Chemie, 2.25 phr of ZnO.
+Control

TABLE 18

Physical Properties

| No | 44 | 45+ |
|---|---|---|
| Flexural Modulus (Mpa) | 65 | 125 |
| % Weight Gain IRM Oil 903 @70° C. | 69 | 54 |

+Control

The TPE composition of Example 44 has the lower flexural modulus that provides a unique feel that can be further improved by adding oil. A lower flexural modulus is possible with syndiotactic polypropylene due to a low crystallinity level as present.

Table 19 gives the composition of SBR masterbatches where the SBR was dynamically vulcanized in a continuous twin-screw extruder in presence of maleated polypropylene and maleated SEBS to provide adhesion of the overmoldings of the thermoplastic elastomer with the nylon plastic substrates. Operating conditions of 300 RPM, extruder barrel temperatures of 180° C. before the oil addition and 200° C. after the oil addition were maintained, and a throughput of about 25 lb/hour was used. The SBR, SEBS and polypropylene were fed into the main feed hopper, peroxide curing agent was added at barrel 5 and oil was added at barrel 7.

TABLE 19

TPE Compositions in Parts Modified for Overmolding onto Nylons

| | No | | | | |
|---|---|---|---|---|---|
| | 46 | 47 | 48 | 49 | 50+ |
| Solflex 16SN42[a] | 100 | 100 | 100 | 100 | 100 |
| Oervac CA100[b] | 100 | 100 | 100 | 3.5 | — |
| Kraton FG1901X[c] | 100 | 150 | 200 | 3.5 | — |
| Kraton G1650 | — | — | — | 48 | 100 |
| Polypropylene, Atofina 3825 | — | — | — | 48 | 100 |
| Renoil 471 | 100 | 100 | 150 | 90 | 100 |
| Talc | 18.1 | 18.1 | 18.1 | 18.1 | 18.1 |
| Vul-Cup 40 KE[d] | 0.4 | 0.4 | 0.4 | 0.4 | 0.4 |
| Total | 418.5 | 468.5 | 568.5 | 311.5 | 418.5 |

+ Control
[a] Solution polymerized random styrene butadiene elastomer with 16 weight % styrene and 42 weight % vinyl (1,2-butadiene), and coupled with Sn
[b] Orevac CA is a maleic anhydride functionalized polypropylene with 1% maleic anhydride content and 10 melt flow index (MFI 190° C./325 g) from Atofina.
[c] Kraton ® FG1901X is a styrene-ethylene, butylene-styrene triblock copolymer that is grafted with maleic anhydride functional groups from Kraton Polymers
[d] 40% active a, a'-bis(tert-butylperoxy)-diisopropylbenzene, a peroxide curing agent from GEO Specialty Chemicals, Inc.

The compositions of Examples 46 through 50 were overmolded on nylon 6 substrates, per the general procedures as described previously for overmolding on polypropylene substrates. The nylon 6 inserts were heated to 140° C. and inserted in the cavity of the mold, and the compositions of Examples 46 through 50 were overmolded on the nylon inserts. After overmolding, the thermoplastic elastomer compositions were subjected to manual torsion by twisting between the two hands. Composition of Example 50 that did not contain the maleated-SEBS and maleated-polypropylene was easily twisted by the torsional force and slipped over the molded nylon substrate. Compositions of Example 46, 47, 48 and 49 were not twisted and did not slip over the nylon substrate and indicated good adhesion of overmolded grips.

In Examples 51 and 52, a two component hydrosilation catalyst was predispersed onto the Solflex 16SN42 in the following manner. A two-gallon polyethylene container was fitted with a slow speed agitator and nitrogen gas sweep and charged with 1750 g of Solflex 16SN42 rubber crumb that contained talc. The crumb rubber was agitated under nitrogen as 70.0 g of tetrakis(dimethylhydrogensiloxy)silane was added dropwise over a 5-minute period and stirred for a period of 15 minutes total under nitrogen. The agitation and nitrogen flow continued as 1.31 g of a platinum carbonyl complex with 3–3.5% platinum concentration in vinyl-terminated polydimethylsiloxane crosslinking catalyst was added dropwise over a 1-minute period and stirred for 15 minutes total under nitrogen. The entire addition and mixing of the crosslinking agent and crosslinking catalyst to the Solflex crumb rubber was maintained at room temperature. This Productive Masterbatch was sealed under nitrogen in a polyethylene container prior to extrusion. The Solflex 16SN42 predispered with the hydrosilation catalyst was added into the main feed hopper of the twin screw extruder the previously described. In Example 51, maleated polypropylene and maleated SEBS are used to provide adhesion to nylon substrates in overmolding. The oil was added into the seventh barrel of the extruder. The total feed of material into the extruder was 25 lb/h and the extruder was operated at a screw speed of 300 RPM with barrel temperatures of 180° C. up to the oil addition and 200° C. thereafter.

TABLE 21

TPE Composition in Parts Prepared with Two Component Hydrosilation Crosslinking Agent for Overmolding onto Nylons

| | No. | |
|---|---|---|
| | 51 | 52+ |
| Solflex 16SN42 | 100 | 100 |
| Oervac CA100 | 100 | — |
| Kraton FG1901X | 100 | — |
| Kraton G1650 | — | 100 |
| Polypropylene, Atofina 3825 | — | 100 |
| Renoil 471 | 100 | 100 |
| Talc | 3.1 | 3.1 |
| Silane crosslinking agent[e] | 4.0 | 4.0 |
| Platinum catalyst[f] | 0.0075 | 0.0075 |
| Total | 407 | 407 |

[e]tetrakis(dimethylsiloxy)silane crosslinking agent from Gelest Inc.
[f]platinum carbonyl complex with 3.0–3.5% platinum concentration in vinyl-terminated polydimethylsiloxane crosslinking catalyst from Gelest Inc.

Thermoplastic Elastomer Compositions of Examples 51 and 52 in which the SBR was crosslinked with the hydrosilation crosslinking system were overmolded on the nylon 6 substrates, as described previously. The overmolded compositions were subjected to the torsional twist. The Example 52 that did not contain the maleated polypropylene and maleated SEBS was easily twisted and slipped over the nylon substrate, indicating poor adhesion. The composition of Example 51 that contained the maleated polypropylene and maleated SEBS adhered well with the nylon substrate and did not slip or delaminate under torsional force.

Table 21 gives the composition of SBR masterbatches where the SBR was dynamically vulcanized in a continuous twin-screw extruder using two silane crosslinking systems. Operating conditions of 300 RPM, barrel temperatures of 180° C. and about 20 lb/hour throughput in the crosslinked examples and 50 lb/h in the uncrosslinked example were used. The SBR and the majority of the polypropylene were fed into the main feed hopper while the silane crosslinking agent and part of the polypropylene were added at barrel 5. The extrudates were pulled through the water bath and water provided the moisture for crosslinking with the vinyl silane crosslinking agent.

TABLE 21

TPE Compositions in Parts Dynamically Vulcanized with a Silane Crosslinking System

| | No | | |
|---|---|---|---|
| | 53 | 54 | 55+ |
| Solflex 16SN42 | 100 | 100 | 100 |
| Polypropylene, Atofina 3825 | 53.85 | 53.85 | 53.85 |
| Talc | 5.26 | 5.26 | 5.26 |
| XL-PEarl ® 23 blend[g] | 3.08 | — | — |
| XL-PEarl ® 31 blend[h] | — | 3.08 | — |
| Total | 162.91 | 162.19 | 159.11 |

+Control (no crosslinking agents)
[g]XL-PEarl 23 is a peroxide/silane blend from Crompton OSi Specialties.
[h]XE-PEarl 31 is a dry silane masterbatch from Crompton OSi Specialties.

TABLE 22

Physical Properties of TPE Compositions Dynamically Vulcanized with a Silane Crosslinking System

| No | 53 | 54 | 55+ |
|---|---|---|---|
| Shore D Hardness | 42 | 43 | 29 |
| Tensile Strength (Mpa) | 12.4 | 12.6 | 5.88 |
| Tear Strength (N/mm) | 51.3 | 53.1 | 43.5 |
| Flexural Modulus (Mpa) | 221 | 237 | 251 |
| % Compression Set B 22 h @ 70 C | 45 | 47 | 86 |
| % Weight Gain, IRM Oil 903, 22 h @ 70 C | 30 | 28 | 48 |

Examples 53 and 54 contain the SBR that has been crosslinked with the vinyl silane crosslinking agent. Low values of compression set and low oil absorption of oil is observed for Examples 53 and 54 indicating crosslinking of the SBR.

The masterbatches can be mixed with the saturated elastomer such as SEBS and oil to obtain softer overmolding compositions.

While certain representative embodiments and details have been shown for the purpose of illustrating the subject invention, it will be apparent to those skilled in this art that various changes and modifications can be made therein without departing from the scope of the subject invention.

What is claimed is:

1. An article of manufacture that is comprised of a soft thermoplastic elastomer composition overmolded onto a hard substrate wherein the soft thermoplastic composition is comprised of (a) a thermoplastic resin selected from the group consisting of polyolefin resins, polyphenylene ether, and polystyrene, wherein the thermoplastic resin is present at a level of up to 60 parts by weight (b) 5 to 90 parts by weight of a rubbery elastomer that is comprised of repeat units that are derived from a conjugated diene monomer selected from 1,3-butadiene and isoprene, wherein the rubbery elastomer is optionally at least partially crosslinked, wherein the repeat units in the rubbery polymer are distributed throughout the rubbery polymer in an essentially random manner, and wherein the rubbery polymer is a solution polymer, (c) 5 to 90 parts by weight of a highly saturated elastomer selected from the group consisting of styrene-ethylene butylene-styrene polymers, styrene-ethylene propylene-styrene polymers, hydrogenated polybutadiene, hydrogenated polyisoprene, hydrogenated styrene-isoprene random copolymers, hydrogenated styrene-isoprene block copolymers, hydrogenated styrene-butadiene random copolymers, hydrogenated styrene-butadiene block copolymers, and (d) 15 to 600 parts by weight of an oil.

2. A process for manufacturing an article of manufacture that comprises (1) melt blending (a) a thermoplastic resin selected from the group consisting of polyolefin resins, polyphenylene ether, and polystyrene, wherein the thermoplastic resin is present at a level of up to 60 parts by weight, (b) 5 to 90 parts of a rubbery elastomer that is comprised of repeat resin units that are derived from a conjugated diene monomer selected from 1,3-butadiene and isoprene, wherein the rubbery elastomer is optionally at least partially crosslinked, wherein the repeat units in the rubbery polymer are distributed throughout the rubbery polymer in an essentially random manner, and wherein the rubbery polymer is a solution polymer, (c) 5 to 90 parts of a highly saturated elastomer selected from the group consisting of styrene-ethylene butylene-styrene polymers, styrene-ethylene propylene-styrene polymers, hydrogenated polybutadiene, hydrogenated polyisoprene, hydrogenated styrene-isoprene random copolymers, hydrogenated styrene-isoprene block copolymers, hydrogenated styrene-butadiene random copolymers, hydrogenated styrene-butadiene block copolymers, and (d) a crosslinking agent to produce a soft thermoplastic composition, wherein the melt blending is conducted above the melt point of the thermoplastic resin, and wherein the crosslinking of the rubbery elastomer is conducted in a continuous mixer; (2) pelletizing the soft thermoplastic elastomer composition as it is being discharged from the mixer, (3) overmolding the soft thermoplastic elastomer composition onto a hard substrate to produce the article of manufacture.

3. A thermoplastic elastomer composition which is comprised of (a) a thermoplastic resin selected from the group consisting of polyolefin resin, polyphenylene ether, and polystyrene, wherein the thermoplastic resin is present at a level of up to 60 parts by weight, (b) 5 to 90 parts by weight of a rubbery elastomer that is comprised of repeat units that are derived from a conjugated diene monomer selected from 1,3-butadiene and isoprene, wherein the repeat units in the rubbery polymer are distributed through the rubbery polymer in an essentially random manner, wherein the rubbery polymer is a solution polymer, and is optionally, at least partially crosslinked, (c) 5 to 90 parts by weight of a highly saturated elastomer selected from the group consisting of styrene-ethylene butylene-styrene, styrene-ethylene propylene-styrene, hydrogenated polybutadiene, hydrogenated polyisoprene, hydrogenated styrene-isoprene random copolymers, hydrogenated styrene-isoprene block copolymers, hydrogenated styrene-butadiene random copolymers, hydrogenated styrene-butadiene block copolymers, hydrogenated styrene-isoprene block copolymers, and hydrogenated styrene-isoprene/butadiene-styrene block copolymer, and (d) 15 to 600 parts by weight of an oil.

4. A thermoplastic elastomer composition as specified in claim 3 wherein the thermoplastic resin is a continuous matrix phase, wherein the rubbery elastomer is a dispersed phase, and wherein the highly saturated elastomer is a dispersed phase.

5. A thermoplastic elastomer composition as specified in claim 3 wherein the thermoplastic resin is a co-continuous phase, wherein the rubbery elastomer is a co-continuous phase, and wherein the highly saturated elastomer is a co-continuous phase.

6. A thermoplastic elastomer composition as specified in claim 3 wherein the highly saturated elastomer is a continuous matrix phase, wherein the rubbery elastomer is a dispersed phase, and wherein the thermoplastic resin is a dispersed phase.

7. A thermoplastic elastomer as specified in claim 3 wherein the rubbery elastomer is styrene-butadiene rubber.

8. A thermoplastic elastomer as specified in claim 7 wherein the styrene-butadiene rubber has a bound styrene content of 10 to 40 weight percent.

9. A thermoplastic elastomer as specified in claim 8 wherein the styrene-butadiene rubber has a vinyl content which is within the range of 10 to 60 percent.

10. A thermoplastic elastomer as specified in claim 3 wherein the rubbery elastomer is coupled with Sn or Si.

11. A thermoplastic elastomer as specified in claim 3 wherein the rubbery elastomer is a hydrogenated nitrile rubber.

12. A thermoplastic elastomer as specified in claim 3 wherein the rubbery elastomer is crosslinked with a hydrosilation crosslinking agent.

13. A thermoplastic elastomer composition as specified in claim 3 wherein the hydrosilation cure system is comprised of a hydrosilation agent and a hydrosilation catalyst.

14. A thermoplastic elastomer composition as specified in claim 3 wherein the hydrosilation agent contains at least two silicon hydride (Si—H) groups per molecule and contains 0.003 to 2.0 weight percent of hydrogen bonded to silicon, and is selected from the group consisting of trimethylsiloxy terminated methylhydrosiloxane-dimethylsiloxane copolymers, hydride terminated polydimethylsiloxanes, hydride terminated methylhydrosiloxane-dimethylsiloxane copolymers, trimethylsiloxy terminated polymethylhydrosiloxanes, poly(dimethylhydrogensiloxy)silanes, tetrakis (dimethylsiloxy)silanes, polymethylcyclotetrasiloxanes and silicon hydrides of methylsiloxanes or polymethyldi- and polymethylsiloxanes.

15. A thermoplastic elastomer composition as specified in claim 3 wherein the hydrosilation catalyst is selected from the group consisting of a platinum, platinum zero compounds complexed with compounds selected from carbon monoxide, fumarates, phosphines, divinyltetramethyldisiloxanes, tetravinyltetramethyldisiloxanes, palladium, chloroplatinic acid, platinum chloride complexes in alcohols, and rhodium, that is complexed with a member selected from divinyltetramethyldisiloxanes or polyvinylmethyldisiloxanes or cyclovinylmethylsiloxanes wherein additional divinylsiloxanes or polyvinulsiloxanes or polyvinylmethylcyclosiloxanes are present, wherein the catalyst or catalyst complexed compounds are incorporated on the block copolymer, crosslinkable elastomer, and/or oil, and are preferably present from about 0.0015 to about 1 parts metal by weight of the crosslinkable elastomer.

16. A thermoplastic elastomer composition of claim 3 wherein the hydrosilation agent is tetrakis(dimethylhydrogensiloxy)silane.

17. A thermoplastic elastomer composition of claim 3 wherein the hydrosilation catalyst is a platinum zero compound that is complexed with carbon monoxide and polyvinylmethylcyclicsiloxanes to give a platinum carbonyl complex in cyclic methylvinylsiloxanes.

18. A thermoplastic elastomer composition of claim 3 wherein the rubbery elastomer is grafted with an anhydride or acid functionality and is crosslinked with an amino-silane crosslinking agent.

19. A thermoplastic elastomer composition of claim 3 wherein the rubbery elastomer is grafted with vinyl silane and the silane grafted elastomer is crosslinked with moisture, and optionally, the thermoplastic resin is grafted with vinyl silane, and the silane grafted thermoplastic resin is crosslinked with moisture.

20. A thermoplastic elastomer composition of claim 3 where the thermoplastic resin is linear-low density polyethylene.

21. A thermoplastic elastomer overmoldable and adhesive composition comprising (a) a thermoplastic and functionalized polymer selected from the group consisting of a copolymers obtained by the hydrogenation of diene repeat units, olefinic resins, and styrene containing thermoplastic resins, wherein the said functional groups are selected from the group consisting of acid anhydrides, acid chlorides, carboxylic acids, isocyanates, epoxides, amines, hydroxyls, and glycidyl acrylates, and glycidylor methacrylates, wherein the thermoplastic and functionalized polymer is present at a level of up to about 500 parts, (b) 100 parts of dynamically crosslinked rubbery elastomer that is comprised of repeat units derived from the conjugated diene monomers selected from 1,3-butadiene, isoprene, and vinyl aromatic monomers, wherein the elastomer is crosslinked in the presence of the thermoplastic polymer, and wherein the thermoplastic elastomer overmoldable and adhesive composition is void of an unfunctionalized polyolefin resins, and wherein the thermoplastic elastomer composition is void of non-elastomeric polyolefin resins comprised of at least one monomer selected from the group consisting of butene, isobutylene, octene-1,4-methyl pentene-1, ethylene, propylene, and hexene-1.

22. An article of manufacture that is comprised of a thermoplastic elastomer composition overmolded onto a hard substrate wherein the thermoplastic elastomer composition is comprised of the thermoplastic elastomer composition as specified in claim 21.

23. An article of manufacture as specified in claim 22 wherein the hard substrate is selected from the group consisting of polypropylene, polyethylene, polystyrene, polycarbonate, polybutylene terephthalate, nylon-6, nylon-11, nylon-12, nylon-6,10, acrylonitrile-butadiene-styrene copolymers, styrene-acrylonitrile copolymers, polyacetal, and metals.

24. A process for manufacturing an article of manufacture that comprises (1) preparing thermoplastic elastomer composition overmolded onto a hard substrate wherein the thermoplastic elastomer overmoldable and adhesive composition is comprised of the thermoplastic elastomer composition as specified in claim 21.

* * * * *